Jan. 3, 1928.  R. COLLINS  1,654,637

NUT LOCK

Filed Jan. 3, 1924

Inventor

Rush Collins

By

Attorney

Patented Jan. 3, 1928.

1,654,637

UNITED STATES PATENT OFFICE.

RUSH COLLINS, OF LACKEY, KENTUCKY.

NUT LOCK.

Application filed January 3, 1924. Serial No. 684,198.

This invention relates to improvements in nut locking devices, particularly adapted to prevent loosening or displacement of the nut upon a bolt.

An important object of the invention is to provide means in connection with a bolt, whereby the nut will be prevented from movement about the bolt.

A further object of the invention is to provide a device for preventing movement of nuts about bolts which may be quickly or easily inserted in position or detached therefrom.

A further object of the invention is to provide a device of this character which is simple and durable, and efficient for the purpose intended.

Other objects and advantages of this invention will be apparent during the course of the following description.

Figure 1:
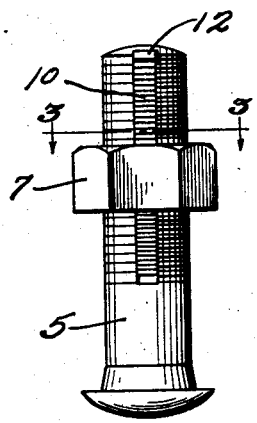
Figure 2:
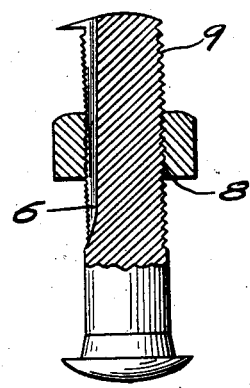
Figure 3:
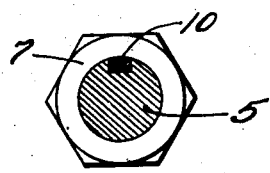
Figure 4:
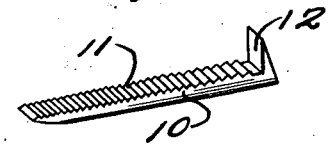

In the accompanying drawing forming a part of this specification and in which like numerals are employed to designate like parts throughout the same:

Figure 1 is a side elevation of my invention used in connection with a bolt and nut, Figure 2 is a similar view, the upper portion thereof, being broken away to show the internal construction thereof, Figure 3 is the horizontal section taken on line 3—3 of Figure 1, and Figure 4 is a perspective view of the nut locking device.

In the drawing, wherein for the purpose of illustration, is shown the preferred embodiment of my invention, the numeral 5 designates a bolt which may be of any conventional design, provided with a longitudinal tapered slot 6 formed on the outer edge thereof. The bolt 5 has a conventional type of nut 7 threadedly mounted thereon, the threads 8 formed on the inner portion of the nut 7 being adapted to engage the threads 9 formed on the outer portion of the bolt 5.

I have provided a tapered key 10 the outer side thereof being serrated to form gripping teeth 11, a head 12 being formed on the upper extremity to permit the teeth to be forcibly inserted in the groove 6 and also to enable the teeth to be forced from the groove when it is desired to remove the nut from the bolt.

It is obvious that the invention may be applied to numerous forms of bolts and nuts now on the market, it being merely necessary to equip the bolt with this locking device by forming the longitudinal groove 6 and inserting the tapered key 10. Due to the simplicity of the device it is apparent that by forcing the key 10 between the grooves 6 and the nut 7, the teeth 11 formed upon the key 10 will engage the threads 8 of the nut, thereby retaining the nut securely in position upon the bolt.

It is to be understood that the form of my invention herewith shown and described is to be taken as the preferred example of the same, and that various changes in the shape, size and arrangement of parts may be resorted to without departing from the spirit of the invention, or the scope of the subjoined claim.

Having thus described my invention, I claim:

A nut lock structure comprising in combination with a bolt having a threaded portion with a groove provided in the side of the bolt at said threaded portion and leading into the body thereof from the outer end, the bottom wall of the groove being tapered with relation to the axis of the bolt, a nut having continuous threads thereon adapted to engage the threads of the bolt, a key adapted to be slid in said groove and being tapered longitudinally and provided at its outer surface with transversely disposed cutting teeth, the teeth on said key being graduated in size so that the smaller teeth first engage the threads on the nut and the spaces between the teeth gradually decrease in transverse breadth from one end of the key towards the other end thereof so that certain of the teeth will be out of alignment with threads on the nut.

In testimony whereof, I have affixed my signature.

RUSH COLLINS.